United States Patent [19]

Muenstedt et al.

[11] Patent Number: 4,772,517
[45] Date of Patent: Sep. 20, 1988

[54] COMPOSITE ELECTRODE

[75] Inventors: Helmut Muenstedt, Wachenheim; Helmut Gebhard, Boehl-Iggelheim, both of Fed. Rep. of Germany

[73] Assignee: BASF Aktiengesellschaft, Ludwigshafen, Fed. Rep. of Germany

[21] Appl. No.: 826,764

[22] Filed: Feb. 6, 1986

[30] Foreign Application Priority Data

Feb. 26, 1985 [DE] Fed. Rep. of Germany ....... 3506659

[51] Int. Cl.⁴ ............................................. B32B 15/04
[52] U.S. Cl. .................... 428/457; 428/500; 429/213
[58] Field of Search ................ 428/500, 457; 429/213

[56] References Cited

U.S. PATENT DOCUMENTS

| 4,321,114 | 3/1982 | MacDiarmid et al. | 429/213 |
| 4,559,112 | 12/1985 | Tamamura et al. | 428/500 |
| 4,559,284 | 12/1985 | Nishimura et al. | 429/213 |
| 4,565,754 | 1/1986 | Muramatsu et al. | 429/213 |
| 4,585,717 | 4/1986 | Watanabe et al. | 429/213 |

FOREIGN PATENT DOCUMENTS

| 1155913 | 10/1983 | Canada . |
| 36118 | 9/1981 | European Pat. Off. . |
| 49970 | 4/1982 | European Pat. Off. . |
| 58469 | 8/1982 | European Pat. Off. . |

*Primary Examiner*—Edith Buffalow
*Attorney, Agent, or Firm*—Keil & Weinkauf

[57] ABSTRACT

In a composite electrode whose active electrode material contains an electrochemically chargeable and dischargeable polymer which is bonded to a conductor, the adhesive contains a finely divided electrically conductive substance.

7 Claims, No Drawings

COMPOSITE ELECTRODE

The present invention relates to a composite electrode whose active electrode material contains an electrochemically oxidizable and/or reducible polymer and a conductor bonded to this.

EP-A-No. 36 118 and EP-A-No. 49 970 describe light-weight batteries which have a high energy density and a high power density and contain a highly electrically conductive, p-doped or n-doped conjugated polymer, in particular polyacetylene, as the active electrode material. The conjugated polymers can be subjected to reversible electrochemical doping and dedoping with the ionic or ionizable compounds present in the electrolyte, and thus converted to various oxidation and reduction states, depending on the degree of doping. In a typical and advantageous embodiment, these batteries contain, for example, a lithium anode and a cathode of p-doped polyacetylene. The electrolyte salts, e.g. lithium perchlorate, are preferably dissolved in an organic electrolyte solvent, such as a linear or cyclic ether, propylene carbonate or acetonitrile.

Suitable electrode materials for such batteries, in addition to polyacetylene, are in particular electrically doped homopolymers and copolymers of compounds from the class consisting of pyrroles, thiophenes and furans.

For complete, uniform charging and discharging of the oxidizable and reducible polymers, very good contact between the electrode material and the conductor is desirable. The conductor advantageously consists of a metal and is generally connected mechanically to the electrode material. However, this has the disadvantage that the bond is sometimes incomplete, so that optimum conductivity is not ensured. Clip connections and press-on connections require expensive embodiments. In another method, the electrically conductive polymer is produced by polymerization directly on the conductor material. However, this method is expensive and does not permit the production of electrodes from preprepared polymer material.

It is an object of the present invention to provide composite electrodes which can be prepared in a technically simple manner and in which there is a mechanically strong, conductive bond between the active electrode material and the conductor, so that sufficient electrical conductivity is ensured.

We have found that this object is achieved by a composite electrode whose active electrode material contains an electrochemically chargeable and dischargeable polymer and a conductor bonded to this by means of an adhesive, wherein the adhesive contains, incorporated therein, a finely divided electrically conductive substance.

The present invention furthermore relates to special embodiments of the composite electrodes corresponding to the detailed description below.

The novel composite electrodes have the advantage that the electrolyte systems used in conjunction with electrochemically oxidizable and reducible polymers do not break the adhesive bond between the polymer and the conductor. The bond is moreover sufficiently flexible to compensate a volume change during charging and discharging of the electrodes, so that the electrode material does not disintegrate during charging and discharging. Another advantage has proven to be the fact that no exposure to heat is required during production of the bond between the electrode material and the conductor by means of an adhesive, so that the active electrode material is not damaged during production of the composite electrode.

The novel composite electrodes contain, as active electrode material, an electrochemically chargeable and dischargeable polymer which, in the charged state, has an electrical conductivity greater than $10^{-2}$, in particular greater than or equal-to one, $\Omega^{-1} cm^{-1}$. Such polymers include, in particular, the electrochemically p-dopable or n-dopable polymers containing conjugated double bonds.

Polymers containing conjugated double bonds are those possessing conjugated unsaturated bonds along their polymer main chain. These include all known doped or dopable conjugated polymers which are electrochemically chargeable and dischargeable, as described in the literature and in particular in EP-A No. 36 118, EP-A No. 49 970 and EP-A No. 58 469.

Preferred active electrode material from the group consisting of the doped or dopable conjugated polymers includes the acetylene polymers, in particular polyacetylene itself, but also the known substituted polyacetylenes or acetylene copolymers. For use as active electrode material, the acetylene polymers may be p-doped with electron acceptors or n-doped with electron donors.

Among the doped, electrochemically chargeable and dischargeable conjugated polymers, those which have proven very particularly advantageous are the polymers of the compounds from the class consisting of 5-membered heterocyclic compounds which possess a conjugated $\pi$-electron system and contain nitrogen, sulfur or oxygen as the hetero atom. For the purposes of the present invention, compounds of this type from the class consisting of 5-membered heterocyclic compounds are compounds from the class consisting of the pyrroles, the thiophenes and the furans.

Compounds from the class consisting of the pyrroles are both unsubstituted pyrrole itself and the substituted pyrroles, such as the N-alkylpyrroles, N-arylpyrroles, the pyrroles which are monosubstituted or disubstituted at the carbon atoms by alkyl, and those which are monosubstituted or disubstituted at the carbon atoms by halogen. In the preparation of the novel copolymers, the pyrroles can be used alone or as a mixture with one another, so that the copolymers can contain one or more different pyrroles as polymerized units. Preferably, the repeating pyrrole units in the copolymers are essentially derived from unsubstituted pyrrole itself. If substituted pyrroles are employed in the preparation, the 3,4-dialkylpyrroles, in particular those where alkyl is of 1 to 4 carbon atoms, such as 3,4-dimethylpyrrole and 3,4-diethylpyrrole, are preferred for this purpose.

Compounds from the class consisting of thiophenes are unsubstituted thiophene itself, 2- and 3-methylthiophene, 2- and 3-ethylthiophene and other alkyl-substituted thiophenes, as well as the thiophenes which are disubstituted by alkyl, such as 2,3-diethylthiophene, and the chlorine-substituted thiophenes. Phenylthiophenes, such as 2-phenylthiophene, and 3-benzylthiophene are also suitable.

Compounds from the class consisting of furans are unsubstituted furan itself as well as the substituted furans, such as alkylfurans, e.g. 3-methyl, 2-ethyl-, 3-ethyl-, 2,2-dimethyl- and 2,3-diethylfuran, and chlorine-substituted furans. Unsubstituted furan itself is preferred.

The above 5-membered heterocyclic compounds possessing a conjugated π-electron system may also be copolymerized with not more than 20% by weight of other compounds capable of being copolymerized with the said heterocyclic compounds. Examples of such compounds are thiazole, oxazole and imidazole. Other suitable comonomers are aminophenanthrene, benzidine, semidine, aminocrysene, aminocarbazole and aniline and/or p-phenylene-diamine.

The homopolymers and copolymers of the compounds from the class consisting of the 5-membered heterocycles can be prepared by subjecting the monomers, i.e. the pyrroles, thiophenes or furans, and, where relevant, the comonomers to anodic oxidation in a solvent in the presence of a suitable conductive salt, the said monomers and comonomers being polymerized during this process.

In addition to the doped and/or electrochemically chargeable and dischargeable conjugated polymers, particularly advantageous active electrode material has proven to be, in particular, electrically conductive polymers which have an electrical conductivity greater than $10^{-2} \Omega^{-1} cm^{-1}$ and contain electrochemically oxidizable and/or reducible redox groups of defined structure which are capable of forming two or more stable oxidation states which preferably are reversibly interconvertible. Polymers of this type which are particularly useful as electrode material for electrochemical cells or batteries are described in detail in, for example, DE-A-No. 32 44 900, which is hereby incorporated by reference. These electrically conductive redox polymers include p-doped and n-doped polymers which contain the redox groups as the side groups bonded to the polymer main chain. These redox groups are mainly those groups capable of forming the quinoid structures, 1,9-disubstituted phenalene radicals being very advantageous redox groups.

Electrically conductive, electrochemically chargeable and dischargeable polymers can be employed in any desired, suitable form as active electrode material in the novel composite electrodes. For example, it is possible to use these polymers in the form of self-supporting films or sheets or in the form of open-cell foamed moldings or foams. This is particularly advisable, for example, where these polymers are capable of forming stable, strong, selfsupporting films or sheets. In this case, the particular electrode consists of electrically conductive, electrochemically oxidizable and/or reducible polymers.

For use as electrode material, the polymers may also be applied to a substrate, for example by laminating a film or sheet of this polymer with the substrate or coating the substrate with the polymer powder. Suitable substrates are inert bases, for example films or sheets of conventional polymers which are stable under the operating conditions of the electrochemical cell or battery, in particular woven fabrics, nonwoven fabrics, etc. made of organic or inorganic, electrically non-conductive materials, e.g. glass mats or the like, which may simultaneously serve as separators or diaphragms.

The electrically conductive, electrochemically chargeable and dischargeable polymers may also be employed for the production of the electrodes in the form of sintered or compressed powders, for example as sintered or compression-molded plates. Compression-molded or sintered electrodes can be produced using the conventional additives, e.g. binders, pigments, carbon black, inert metals, bases or matrix materials, such as other polymeric substances. These additives are present in the electrode materials in general in amounts of less than 50% by weight, based on the total electrode, the electrode preferably being produced without these additives. It is also possible to use the electrically conductive, electrochemically chargeable and dischargeable polymers in net electrodes or cage electrodes.

The conductors bonded to the active electrode material advantageously consist of metal, for example a light metal which is stable in the potential range used. Preferred light metals or light metal alloys are aluminum or aluminum-containing alloys. The conductors are advantageously in the form of sheets whose width corresponds to that of the electrode. The conductors are bonded to the electrode material so that they overlap the latter. An adhesive layer is located between the conductor and the electrode material. Suitable adhesives are those which permit a strong bond between the polymer and the active electrode material, and adhesives of this type are known. Preferred adhesives are those based on polyisobutylene and carboxyl-containing ethylene polymers. Advantageously, polyisobutylene having a molecUlar weight of from 40,000 to 200,000 g/mole is used.

The adhesive layer preferably contains a carboxyl-containing ethylene polymer in which finely divided electrically conductive substances are embedded. Polymers whose melt index is from 6 to 8 g/10 min are advantageously used. For the purposes of the present invention, carboxyl-containing ethylene polymers are copolymers of ethylene which contain, for example, acrylic acid or methacrylic acid as copolymerized units. Other monomers, e.g. acrylates, may also be present as copolymerized units. The preparation of such carboxyl-containing copolymers is described in, for example, German Pat. No. 1,520,493. Particularly suitable copolymers are those which contain not only ethylene but also acrylic or methacrylic acid or their tert.-butyl esters as copolymerized units, as described in, for example, German Pat. No. 2,119,047.

Graft polymers of acrylic and methacrylic acid on ethylene polymers may also be used.

An essential feature of the invention is that this adhesive layer contains, embedded therein, finely divided electrically conductive substances which are stable in the potential range used. Carbon black and graphite are preferred, and finely divided metals may also be used, although it is advisable to employ the metal of the conductor material in order to avoid formation of an electrochemical element between the conductor and the incorporated metal. The latter advantageously has a particle size of from 20 to 100 μm. The adhesive is mixed with the conductive substance in an amount of from 10 to 50%, based on the mixture.

The adhesive with the incorporated conductive material can be applied in molten form to the electrode materials and conductor materials to be bonded. In general, it is advantageous to use the adhesive in the form of a solution, the latter advantageously containing from 50 to 95%, based on the adhesive, of solvent.

To bond the electrode material to the conductor, the adhesive is first applied to the electrode material, to the conductor or to both parts. Bonding is effected under pressure, the pressure being removed after the solvent has diffused away. If fusible adhesives are used, the adhesive is applied in the form of a melt to the electrode material or the conductor, the bond is produced under pressure and, when the material has cooled, the pressure is removed.

EXAMPLE 1

A solution of 10 parts by weight of polyisobutylene having a molecular weight of 40,000 g/mole in 90 parts by weight of toluene is prepared, and 30 parts by weight, based on the polyisobutylene, of carbon black having a mean particle size of 50 $\mu$m are incorporated into this solution. The resulting solution is applied onto an aluminum sheet, which is then bonded to a polypyrrole film. A bond is produced under a pressure of 10 bar, the pressure being removed when the solvent has diffused away. The composite consisting of aluminum and carbon blackfilled polyisobutylene has a conductivity of $10^{-1}$ S/cm and hence constitutes a highly conductive bond between the electrochemically active polymer film and the metallic conductor. When the composite electrode is cycled in an electrolyte consisting of propylene carbonate and LiClO$_4$, it is found that the films do not become detached even after a few hundred cycles.

EXAMPLE 2

A solution of 5 parts by weight of polyisobutylene having a molecular weight of 85,000 g/mole in 95 parts by weight of naphtha is prepared, and 30 parts by weight, based on polyisobutylene, of conductive carbon black are mixed into this solution using an Ultra-Turrax stirrer. The resulting solution is applied onto a cleaned aluminum sheet to give a layer about 100 $\mu$m thick. Evaporating the solvent gives a thin electrically conductive layer about 10 $\mu$m thick, which is bonded to a polypyrrole film by means of gentle pressure, the resulting bond being virtually unbreakable. The properties of this electrode are similar to those in Example 1.

EXAMPLE 3

A solution of 9 parts by weight of polyisobutylene having a molecular weight of 40,000 g/mole, 1 part by weight of polyisobutylene having a molecular weight of 200,000 g/mole and 90 parts by weight of toluene is prepared, and 20 parts by weight, based on polyisobutylene, of carbon black are mixed with this polymer solution. The resulting solution is applied onto a sheet of a nickel/chromium alloy. After the solvent has been evaporated, the polypyrrole film is pressed on. The addition of a small amount of the high molecular weight component reinforces the adhesive effect. No loosening of the bond was observed in propylenecarbonate.

EXAMPLE 4

A solution of 10 parts by weight of an ethylene polymer, which contains acrylic acid groups and tert.-butyl acrylate groups and has a melt index of from 6 to 8 g/10 min, in 90 parts by weight of xylene is prepared at 80° C. and 30 parts by weight, based on the polymer, of carbon black having a mean particle size of 20 $\mu$m are incorporated into this solution. The resulting solution is applied onto an aluminum sheet at about 100° C., the solvent is evaporated off and the aluminum sheet is bonded under pressure to a polypyrrole film. The conductivity of the adhesive layer is 1 S/cm, and the composite exhibits excellent adhesion. In various aprotic solvents, as conventionally used in battery technology, the bond is found to remain unbroken over a period of several weeks. Even the change in the volume of the polymer film which occurs on cycling the polypyrrole does not result in any marked deterioration in the mechanical properties of the composite.

EXAMPLE 5

The conductive carbon black from Example 4 is mixed into the carboxyl-containing ethylene copolymer described, in the molten state, at from 150° to 200° C., using a kneader. The conductivity of the filled polymer can be varied, depending on the concentration of carbon black. The carbon black-filled melt is painted onto a preheated metal sheet after which a polypyrrole film is pressed on under pressure. The properties of the composite are similar to those of the electrode in Example 1.

We claim:

1. A composite electrode whose active electrode material contains an electrochemically chargeable and dischargeable conjugated polymer which can be doped, and a conductor bonded to electrode by means of an adhesive, wherein the adhesive contains, incorporated therein, a finely divided electrically conductive substance.

2. The composite electrode of claim 1, wherein the electrochemically chargeable and dischargeable polymer contains conjugated double bonds.

3. The composite electrode of claim 1, wherein the electrochemically chargeable and dischargeable polymer is a pyrrole or thiophene polymer.

4. The composite electrode of claim 1, wherein the conductor consists of a light metal or a light metal alloy which is stable under the electrochemical potential used.

5. The composite electrode of claim 1, wherein the conductor consists of aluminum or an aluminum alloy.

6. The composite electrode of claim 1, wherein the electrically conductive finely divided substance is stable at the electrochemical potential used.

7. The composite electrode of claim 1, wherein the finely divided electrically conductive substance is carbon black or graphite.

* * * * *